(12) United States Patent
Rathonyi et al.

(10) Patent No.: US 11,582,792 B2
(45) Date of Patent: Feb. 14, 2023

(54) DCI FORMATS FOR NON-ANCHOR OPERATIONS

(71) Applicant: TELEFONAKTIEBOLAGET LM ERICSSON (PUBL), Stockholm (SE)

(72) Inventors: Béla Rathonyi, Lomma (SE); Andreas Höglund, Solna (SE); Ali Nader, Malmö (SE); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 568 days.

(21) Appl. No.: 16/325,121

(22) PCT Filed: Aug. 11, 2017

(86) PCT No.: PCT/IB2017/054906
§ 371 (c)(1),
(2) Date: Feb. 12, 2019

(87) PCT Pub. No.: WO2018/029643
PCT Pub. Date: Feb. 15, 2018

(65) Prior Publication Data
US 2021/0307059 A1 Sep. 30, 2021

Related U.S. Application Data

(60) Provisional application No. 62/374,600, filed on Aug. 12, 2016.

(51) Int. Cl.
*H04W 74/00* (2009.01)
*H04W 74/08* (2009.01)

(52) U.S. Cl.
CPC ....... *H04W 74/006* (2013.01); *H04W 74/008* (2013.01); *H04W 74/0833* (2013.01)

(58) Field of Classification Search
None
See application file for complete search history.

(56) References Cited

U.S. PATENT DOCUMENTS

2010/0232382 A1* 9/2010 Gauvreau ......... H04W 72/0413
370/329
2012/0026952 A1 2/2012 Okubo et al.
(Continued)

FOREIGN PATENT DOCUMENTS

CN 101877621 A * 11/2010
EP 3498029 A1 6/2019

OTHER PUBLICATIONS

Ericsson, et al., Random access resource selection for carrier aggregation, Tdoc R2-101990, 3GPP TSG-RAN WG2 #69bis, Beijing, China, Apr. 12-16, 2010.
(Continued)

*Primary Examiner* — The Hy Nguyen

(57) ABSTRACT

According to certain embodiments, a method for use in a network node comprises broadcasting system information to wireless devices. The system information indicates a set of configured random access carriers. The method further comprises selecting, from the set of configured random access carriers, a random access carrier to be used by a wireless device when performing random access transmissions, and indicating the selected random access carrier to the wireless device.

54 Claims, 13 Drawing Sheets

(56) References Cited

U.S. PATENT DOCUMENTS

| | | | |
|---|---|---|---|
| 2012/0320840 A1* | 12/2012 | Kim | H04L 5/001 |
| | | | 370/329 |
| 2013/0010619 A1* | 1/2013 | Fong | H04W 72/0453 |
| | | | 370/252 |
| 2014/0098761 A1 | 4/2014 | Lee et al. | |
| 2014/0161002 A1* | 6/2014 | Gauvreau | H04L 5/06 |
| | | | 370/280 |
| 2014/0293915 A1 | 10/2014 | Pelletier et al. | |
| 2017/0238284 A1* | 8/2017 | Tseng | H04W 72/042 |
| | | | 370/329 |
| 2017/0280481 A1* | 9/2017 | Stern-Berkowitz | H04W 74/0833 |
| 2018/0020432 A1* | 1/2018 | Rico Alvarino | H04W 8/22 |
| 2018/0242306 A1* | 8/2018 | Wong | H04W 72/042 |
| 2018/0352590 A1* | 12/2018 | Sha | H04W 76/10 |
| 2019/0239051 A1* | 8/2019 | Hwang | H04W 72/0453 |
| 2020/0329502 A1* | 10/2020 | Beale | H04W 74/0833 |

OTHER PUBLICATIONS

ZTE, New WI proposal on further enhancement of IoT in LTE, RP-160917, 3GPP TSG RAN Meeting #72, Busan, Korea, Jun. 13-16, 2016.

\* cited by examiner

DCI FORMATS FOR NON-ANCHOR OPERATIONS

This application is a 371 of International Application No. PCT/IB2017/054906, filed Aug. 11, 2017, which claims priority to U.S. Application No. 62/374,600, filed Aug. 12, 2016, the disclosures of which are fully incorporated herein by reference.

TECHNICAL FIELD

Certain embodiments of the present disclosure relate, in general, to wireless communications and, more particularly, to new downlink control information (DCI) formats for non-anchor operations.

BACKGROUND

Machine Type Communication (MTC) generally refers to devices that communicate without human interaction, i.e., devices built into machines. MTC is part of the even more general discussion of Internet of things (IoT), where it is envisioned that all devices that can benefit from being connected will be connected. Predictions for coming years point toward there being a very large number of MTC devices. Many of these devices such as narrowband IoT (NB-IoT) devices will probably be fairly stationary, e.g., the device is located in a vending machine and perhaps even built into walls. These devices are meant to last many years and operate without chargers. For example, the NB-IoT system which is based on existing LTE systems and addresses optimized network architecture and improved indoor coverage for massive number of devices is designed for following characteristics:

- low throughput devices (e.g., 2 kbps)
- low delay sensitivity (~10 seconds)
- ultra-low device cost (below 5 dollars)
- low device power consumption (battery life of 10 years)

It is envisioned that each cell (~1 km$^2$) in this system will serve many thousand devices such as sensors, meters, actuators, and the like. In order to be able to make use of existing spectrum for, e.g., GSM, a fairly narrow bandwidth has been adopted for NB-IoT technology (e.g., 180 KHz bandwidth, same as one LTE Physical Resource Block (PRB)).

For FDD mode of NB-IoT (i.e., the transmitter and the receiver operate at different carrier frequencies) only half-duplex mode needs to be supported in the UE. In order to achieve improved coverage, data repetition is used both in uplink (UL) and/or downlink (DL). The lower complexity of the devices (e.g., only one transmission/receiver chain) means that some repetition might be needed also in normal coverage. Further, to alleviate user equipment (UE) complexity, the working assumption is to have cross-subframe scheduling. That is, a transmission is first scheduled on a Physical DL Control Channel (NPDCCH) and then the first transmission of the actual data on the Physical DL Shared Channel (NPDSCH) is carried out after the final transmission of the NPDCCH. Similarly, for UL data transmission, information about resources scheduled by the NW and needed by the UE for UL transmission is first conveyed on the NPDCCH and then the first transmission of the actual data by the UE on the Physical UL Shared Channel (NPUSCH) is carried out after the final transmission of the NPDCCH. In other words, for both cases above, there is no simultaneous reception of control channel and reception/transmission of data channel from the UE's perspective.

Furthermore, not all the subframes are available for dedicated data communication in DL in an NB-IoT cell. The amount of available subframes in the DL is dependent on one of the three operation modes (i.e., Stand-alone, In-band, and Guard-band) NB-IoT is deployed in. For all operation modes, a UE needs to rate-match around the following non-available subframes (or parts of subframe):

- The NB-IoT primary and secondary synchronization channels (NPSS, and NSSS), where NPSS is transmitted every radio frame and NSSS transmission cycle is every other frame. In NB-IoT, the radio frame length is the same as in LTE, i.e., 10 ms consisting of 10 subframes. NPSS is transmitted in subframe number 5.
- The NB-IoT broadcast channel (NPBCH) containing the Master Information Block (MIB) occupies subframe 0 in every radio frame.
- The NB-IoT system information blocks broadcast on NPDSCH (e.g., NSIB1 broadcast in subframe 4 of every other radio frame)
- DL gaps when configured
- NB-IoT reference symbols (NRS)

And in addition, in the case in-band operation mode, LTE reference symbols such as CRS and PRS, and LTE MBSFN subframes.

Due to the nature of NB-IoT with half-duplex communication, cross-subframe scheduling, low bandwidth, the available amount of subframes, and the amount of UEs to be served, it becomes evident that, as all other communication systems, NB-IoT will naturally benefit from utilizing more spectrum for efficient operation, especially if such spectrum is already available (e.g., in an in-band operation mode during low traffic hours when LTE carrier is not fully used). Therefore, in 3GPP Rel-13, NB-IoT multi-carrier operation has been adopted where the UE operating in an NB-IoT anchor carrier is configured through higher layer signaling (Layer 3 RRC) to operate on an NB-IoT non-anchor carrier[1] during connected mode operation. At the end of the connected mode operation, the UE autonomously returns back to the anchor carrier (when released/suspended by the eNB to idle mode). According to 3GPP Rel-13, in connected mode, all Random Access (RA) attempts are to be performed on the anchor carrier until after the contention resolution (Msg4) where either the UE goes back to the carrier that was serving it autonomously or the NW provides an explicit configuration to the UE steering it to another carrier.

[1] Note that the non-anchor carrier does not have the requirement to be deployed on the 100 kHz raster; i.e., any LTE in-band PRB can be used as non-anchor Based on the agreement in [R1-161548],[2] "The UE in RRC_IDLE camps on the NB-IoT carrier on which the UE has received NB-PSS/SSS, NB-PBCH and SIB transmissions", an DL Anchor PRB or carrier in this invention is defined as where the NB-PSS/SSS, NB-PBCH and SIB transmissions take place.

[2] R1-161548, "RAN1 agreements for Rel-13 NB-IoT", source WI rapporteur (Ericsson), 3GPP TSG-RAN WG1 Meeting #84, St. Julian's, Malta, Feb. 15-19, 2016

Based on the agreement in [R1-161548],[3] "For initial access, the NB-IoT DL/UL frequency separation is configured by higher layers (SIBx) and is cell-specific", and "After the initial random access procedure success, there can also be a UE specific configuration for the NB-IoT DL/UL frequency separation.", a UL anchor PRB or carrier is defined as the UL frequency that is signaled to the NB-IoT device via higher layer signaling. Notice, based on the agreement in [R1-161548],[4] the UL anchor PRB can be but not necessary different from the PRB where the initial random access takes place.

[3] Id.
[4] Id.

For Rel-14 it has now been proposed to extend this multi-carrier operation and according to one of the Rel-14 work item objectives, unlike release-13 operation, UEs shall be able to both monitor paging and perform Random Access on non-anchor carriers.[5]

[5] RP-161324, New work item proposal: Enhancements of NB-IoT, source Vodafone, Huawei, HiSilicon, Ericsson, Qualcomm, 3GPP TSG RAN Meeting #72, Busan, Korea, 13-16 Jun. 2016.

FIG. 1 illustrates the center frequency offsets of LTE PRBs for even and odd system bandwidths. The DC carrier is placed in between of two PRBs (even number of PRBs) or in the middle of the middle PRB (odd number cases). As discussed in [R1-160082] and [R1-160022],[6] if a 100 kHz raster is used, not all PRBs can be used for NB-IoT in-band deployment. For the guard-band operation, though the granularity does not need to be 1 PRBs, in order to maintain orthogonality to the legacy LTE system and limited the offset to ±2.5 kHz or ±7.5 kHz from 100 kHz raster grid, only several positions in the LTE guard-band can be used for the NB-IoT downlink carriers.[7] In the evaluations in [R1-160080] and [R1-160021],[8] ±2.5 kHz and ±7.5 kHz offset from the 100 kHz grid can be accommodated by the cell search process.

[6] R1-160082, NB-IoT Channel Raster, source Ericsson, 3GPP TSG-RAN1 NB-IOT Ad Hoc 18-20 Jan. 2016, Budapest, Hungary; and R1-160022, Channel raster design, source Huawei, HiSilicon, 3GPP TSG-RAN1 NB-IOT Ad Hoc 18-20 Jan. 2016, Budapest, Hungary
[7] R1-160082, NB-IoT Channel Raster, source Ericsson, 3GPP TSG-RAN1 NB-IOT Ad Hoc 18-20 Jan. 2016, Budapest, Hungary
[8] R1-160080, NB-IoT—Synchronization Channel Evaluations, source Ericsson, 3GPP TSG-RAN1 NB-IOT Ad Hoc 18-20 Jan. 2016, Budapest, Hungary; and R1-160021, Synchronization signal evaluation, source Huawei, HiSilicon, 3GPP TSG-RAN1 NB-IOT Ad Hoc 18-20 Jan. 2016, Budapest, Hungary To be more specific, for the guard-band operation, as shown in [R1-160082],[9] for an LTE system with 10 or 20 MHz system bandwidth, it is possible to find NB-IoT downlink carrier frequency that is 2.5 kHz off the 100 kHz frequency raster. For other LTE system bandwidth, the offset to the 100 kHz raster is 52.5 kHz. Therefore, in order to get within the same ±7.5 kHz to the 100 kHz grid, 3 guard subcarriers are needed. One guard carrier is 15 kHz width and placed in the same FFT grid at the legacy LTE system that gives orthogonality to the legacy LTE PRB. However, there are no other solutions to put the NB-IoT downlink carriers on the exact 100 kHz raster grids on the LTE guard-band without losing orthogonality to the legacy LTE system. Therefore, for a NB-IoT DL carrier that contains synchronization signal and system information, it can only be put on a frequency that is near the 100 kHz grid point.

[9] R1-160082, NB-IoT Channel Raster, source Ericsson, 3GPP TSG-RAN1 NB-IOT Ad Hoc 18-20 Jan. 2016, Budapest, Hungary In order to achieve coverage requirement of the NB-IoT systems, compared to the average LTE data channel transmit power, a 6 dB power boosting is preferred for the downlink of the in-band and guard-band deployment.[10] The power boosting is with respect to the legacy data channel. But due to spectrum requirement, this 6 dB power boosting cannot be applied at arbitrary places in the guard band. To be more specific, it is stated in [RP-161324],[11] that "Feasibility of boosting for transmission in the guard band depends on the system bandwidth, spacing between NB-IoT and LTE, and also the amount of boosting. When NB-IOT is not very close to the edge of the system bandwidth and with proper design of base station equipments, power boosting of up to 6 dB would be feasible."

[10] RP-161324, New work item proposal: Enhancements of NB-IoT, source Vodafone, Huawei, HiSilicon, Ericsson, Qualcomm, 3GPP TSG RAN Meeting #72, Busan, Korea, 13-16 Jun. 2016.
[11] RP-161324, New work item proposal: Enhancements of NB-IoT, source Vodafone, Huawei, HiSilicon, Ericsson, Qualcomm, 3GPP TSG RAN Meeting #72, Busan, Korea, 13-16 Jun. 2016.

Certainly by increasing the number of repetitions, NB-IoT devices without good coverage can still be reached when the transmit power is not high enough. But this is at an expense of the system capacity. This can be very problematic when the network traffic is heavier than usual, e.g., for the case of software and firmware update. Therefore, multi-PRB operations are proposed in Rel-13 NB-IoT to help to alleviate the problem. In Rel-13 when multi-PRB is configured, an NB-IoT listens to the anchor carrier for system information, but its data transmission in connected mode can be done on other UL/DL carriers referred sometimes to secondary PRBs or non-anchor carriers. The non-anchor carrier position(s) can be sent to the NB-IoT devices explicitly, e.g., by RRC configuration or via system information, as described in U.S. Patent Application 62/292,053. Accordingly, the positions of the non-anchor carrier in the downlink are not constrained to near the 100 kHz grid. In this way, NB-IoT devices in good coverage can be moved to non-anchor carriers with lower power, and NB-IoT devices in bad coverage can be served by carriers/PRBs with higher power boosting.

For the uplink operation, the deployment is more flexible, as it is not necessary to put the UL carrier in a position that is near the 100 kHz grid. That is the NB-IoT device can get the downlink and uplink carrier duplex distance via system information (can be configured on an individual UE basis as described in [R1-161548][12]), if the default duplex distance is not applied. Therefore, the placement of the uplink NB-IoT anchor carrier has more flexibility. For the downlink operation, only 15 kHz subcarrier spacing is used for the NB-IoT system. But for the uplink, two different numerologies, i.e., 3.75 kHz and 15 kHz, of the uplink subcarrier spacing are defined in NB-IoT, for the single tone uplink transmission. For uplink with multi-tone transmission, only 15 kHz subcarrier spacing is used.

[12] R1-161548, "RAN1 agreements for Rel-13 NB-IoT", source WI rapporteur (Ericsson), 3GPP TSG-RAN WG1 Meeting #84, St. Julian's, Malta, Feb. 15-19, 2016.

In the current Rel-13 NB-IoT system, paging and NB-IoT physical random access channel (NPRACH) can only be carried on the anchor carrier, even when multi-carriers are configured for NB-IoT. As the number of the UEs in the cell increases, the needs of paging and NPRACH resources also increase. Therefore, in [RP-161324][13] it is proposed to study sending paging and random access requests on non-anchor NB-IoT carriers

[13] RP-161324, New work item proposal: Enhancements of NB-IoT, source Vodafone, Huawei, HiSilicon, Ericsson, Qualcomm, 3GPP TSG RAN Meeting #72, Busan, Korea, 13-16 Jun. 2016.

SUMMARY

Certain problems can be envisioned in the current Rel-13 NB-IoT system. For example, paging and NPRACH can only be carried on the anchor carrier, even when multiple carriers are configured for NB-IoT. As the number of UEs in the cell increases, the load of paging and NPRACH transmissions also increase. Therefore, in [RP-161324][14] it is proposed to study sending paging and random access Msg1/Msg3 on non-anchor NB-IoT carriers. At this moment, a PDCCH order cannot point out an UL carrier (only the NPRACH resource and the start subcarrier) where the UE in connected mode performs its random access transmission. Further, the network, NW, cannot control on what UL carrier the user equipment, UE, accesses the system as part of being paged. In addition, the current NW cannot control on what DL carrier the paging message is transmitted. Certain embodiments of the present disclosure may provide solutions to these or other problems.

[14] RP-161324, New work item proposal: Enhancements of NB-IoT, source Vodafone, Huawei, HiSilicon, Ericsson, Qualcomm, 3GPP TSG RAN Meeting #72, Busan, Korea, 13-16 Jun. 2016

Disclosed herein is a proposal for the network node to indicate to the wireless device a random access carrier (e.g., UL PRACH carrier) to be used by the wireless device when performing random access transmissions. A random access transmission on an UL carrier is part of a random access procedure (the random access procedure includes both UL and DL transmissions). The random access procedures is initiated by UEs in connected mode when receiving a PDCCH order and by UEs in idle mode when being paged (i.e. receiving a paging message addressed to its UE identity). The random access carrier information can be carried in downlink control information (DCI) (e.g., DCI transmitted on NPDDCH) or in paging messages (e.g., paging messages transmitted on NPDSCH).

According to a first embodiment, a method for use in a network node comprises broadcasting system information. The system information indicates a set of configured random access carriers. The method further comprises selecting, from the set of configured random access carriers, a random access carrier to be used by a wireless device when performing random access transmissions, and indicating the selected random access carrier to the wireless device.

According to a second embodiment, a network node comprises one or more interfaces and one or more processors. The one or more interfaces are operable to broadcast system information. The system information indicates a set of configured random access carriers. The one or more processors are operable to select, from the set of configured random access carriers, a random access carrier to be used by a wireless device when performing random access transmissions, and to indicate the selected random access carrier to the wireless device.

According to a third embodiment, a computer program product comprises a non-transitory computer readable storage medium having computer readable program code embodied therein. The computer readable program code comprises computer readable program code to broadcast system information. The system information indicates a set of configured random access carriers. The computer readable program code comprises computer readable program code to select, from the set of configured random access carriers, a random access carrier to be used by a wireless device when performing random access transmissions, and computer readable program code to indicate the selected random access carrier to the wireless device.

According to a fourth embodiment, a method for use in a wireless device comprises receiving system information being broadcast by a network node. The system information indicates a set of configured random access carriers supported by the network node. The method comprises determining whether the network node has indicated a selected random access carrier from the set of configured random access carriers. In response to determining that the network node has indicated the selected random access carrier, the method comprises performing random access transmissions using the selected random access carrier indicated by the network node. In response to determining that the network node has not indicated the selected random access carrier, the method comprises performing random access transmissions using a random access carrier that the wireless device selects from the set of configured random access carriers.

According to a fifth embodiment, wireless device comprises one or more interfaces and one or more processors. The one or more interfaces are operable to receive system information being broadcast by a network node. The system information indicates a set of configured random access carriers supported by the network node. The one or more processors are operable to determine whether the network node has indicated a selected random access carrier from the set of configured random access carriers. In response to determining that the network node has indicated the selected random access carrier, the one or more processors are operable to perform a random access transmission using the selected random access carrier indicated by the network node. In response to determining that the network node has not indicated the selected random access carrier, the one or more processors are operable to perform a random access transmission using a random access carrier that the wireless device selects from the set of configured random access carriers.

According to a sixth embodiment, a computer program product comprises a non-transitory computer readable storage medium having computer readable program code embodied therein. The computer readable program code comprises computer readable program code to receive system information being broadcast by a network node. The system information indicates a set of configured random access carriers supported by the network node. The computer readable program code comprises computer readable program code to determine whether the network node has indicated a selected random access carrier from the set of configured random access carriers. In response to determining that the network node has indicated the selected random access carrier, the computer readable program code performs a random access transmission using the selected random access carrier indicated by the network node. In response to determining that the network node has not indicated the selected random access carrier, the computer readable program code performs a random access transmission using a random access carrier that the wireless device selects from the set of configured random access carriers.

In any of the first through sixth embodiments, an index can be used to indicate the selected random access carrier. Any suitable index may be used. As one example, an index value of 1 could indicate the selection of the first random access carrier listed in the system information, an index value of 2 could indicate the selection of the second random access carrier listed in the system information, and so on. Other embodiments may use other indexes, for example index 0 could indicate the first random access carrier in the list and index 1 the second random access carrier in the list.

In any of the first through sixth embodiments, the selected random access carrier can be indicated by communicating downlink control information (DCI) from the network node that explicitly indicates the selected random access carrier to the wireless device. For example, in some embodiments the DCI may use the index discussed above to explicitly indicate the selected random access carrier. Certain embodiments carry the DCI on a control channel. As an example, the control channel can be a physical downlink control channel (PDCCH), such as a Narrowband PDCCH (NPDCCH).

In certain embodiments, the DCI can be sent in a control channel order, such as a PDCCH order or an NPDCCH order that is sent to the wireless device in connected mode and that orders the wireless device to perform a random access transmission.

In certain embodiments, the DCI can be sent in a scheduling message that schedules a paging message. The scheduling message indicates the selected random access carrier to be used by the wireless device when performing the random access transmission that is initiated in response to the wireless device receiving the paging message. The scheduling message can be sent to the wireless device in idle mode.

In another variation of the first through sixth embodiments, a paging message from the network node may be used to indicate the selected random access carrier to be used by the wireless device when performing the random access transmission that is initiated in response to the wireless device receiving the paging message. In certain embodiments, the paging message is communicated via a Narrowband Physical Downlink Shared Channel PDSCH (NPDSCH) or other PDSCH.

In yet another variation of the first through sixth embodiments, the system information broadcast by the network node provides information about downlink (DL) carriers and uplink (UL) carriers. The UL carriers belong to the set of configured random access carriers. The information about the carriers indicates an association between one of the DL carriers and a default UL carrier. The association implicitly indicates the selected random access carrier to the wireless device. For example, a message communicated on a particular DL carrier indicates that the selected random access carrier corresponds to the default UL carrier that the system information associates with the particular DL carrier that communicated the message. Any suitable message may be used to implicitly indicate the selected random access carrier, such as a control channel order, a scheduling message, or a paging message sent on a DL carrier having an associated default UL carrier.

In a seventh embodiment, a method for use in a network node comprises selecting a DL carrier for sending a paging message to a wireless device. The selected DL carrier is selected from a set of configured DL carriers. The method comprises sending downlink control information (DCI) to the wireless device via a physical downlink control channel (PDCCH). The DCI schedules the paging message and indicates the selected DL carrier for the paging message. The method further comprises sending the paging message on the selected DL carrier, the paging message carried on a Physical Downlink Shared Channel (PDSCH).

In an eighth embodiment, a network node comprises one or more processors and one or more interfaces. The one or more processors are operable to select a DL carrier for sending a paging message to a wireless device. The selected DL carrier is selected from a set of configured DL carriers. The one or more interfaces are operable to send downlink control information (DCI) to the wireless device via a physical downlink control channel (PDCCH). The DCI schedules the paging message and indicates the selected DL carrier for the paging message. The one or more interfaces are further operable to send the paging message on the selected DL carrier, the paging message carried on a Physical Downlink Shared Channel (PDSCH).

In an ninth embodiment, a computer program product comprises a non-transitory computer readable storage medium having computer readable program code embodied therein. The computer readable program code comprises computer readable program code to select a DL carrier for sending a paging message to a wireless device. The selected DL carrier is selected from a set of configured DL carriers. The computer readable program code comprises computer readable program code to send downlink control information (DCI) to the wireless device via a physical downlink control channel (PDCCH). The DCI schedules the paging message and indicates the selected DL carrier for the paging message. The computer readable program code further comprises computer readable program code to send the paging message on the selected DL carrier, the paging message carried on a Physical Downlink Shared Channel (PDSCH).

In a tenth embodiment, a method for use in a wireless device comprises receiving downlink control information (DCI) from a network node via a physical downlink control channel (PDCCH). The DCI schedules a paging message. The method comprises determining, from the set of configured DL carriers, a selected DL carrier for receiving the paging message. The selected DL carrier is determined based on an indication in the DCI received from the network node. The method further comprises receiving the paging message on the selected DL carrier. The paging message is carried on a Physical Downlink Shared Channel (PDSCH).

In an eleventh embodiment, a wireless device comprises one or more interfaces and one or more processors. The one or more interfaces are operable to receive downlink control information (DCI) from a network node via a physical downlink control channel (PDCCH). The DCI schedules a paging message. The one or more processors are operable to determine, from the set of configured DL carriers, a selected DL carrier for receiving the paging message. The selected DL carrier is determined based on an indication in the DCI received from the network node. The one or more interfaces are further operable to receive the paging message on the selected DL carrier. The paging message is carried on a Physical Downlink Shared Channel (PDSCH).

In an twelfth embodiment, a computer program product comprises a non-transitory computer readable storage medium having computer readable program code embodied therein. The computer readable program code comprises computer readable program code to receive downlink control information (DCI) from a network node via a physical downlink control channel (PDCCH). The DCI schedules a paging message. The computer readable program code comprises computer readable program code to determine, from the set of configured DL carriers, a selected DL carrier for receiving the paging message. The selected DL carrier is determined based on an indication in the DCI received from the network node. The computer readable program code further comprises computer readable program code to receive the paging message on the selected DL carrier. The paging message is carried on a Physical Downlink Shared Channel (PDSCH).

Certain embodiments of the present disclosure may provide one or more technical advantages. Certain embodiments may allow the network to control on what UL carrier a UE accesses the system as part of being paged. Certain embodiments may allow the network to control on what DL carrier the paging message is transmitted. Certain embodiments may potentially allow for improved load distribution, power consumption, power efficiency, and/or energy savings. Certain embodiments may have all, some, or none of these advantages. Other advantages will be apparent to persons of ordinary skill in the art.

BRIEF DESCRIPTION

DETAILED DESCRIPTION

Figure 1:
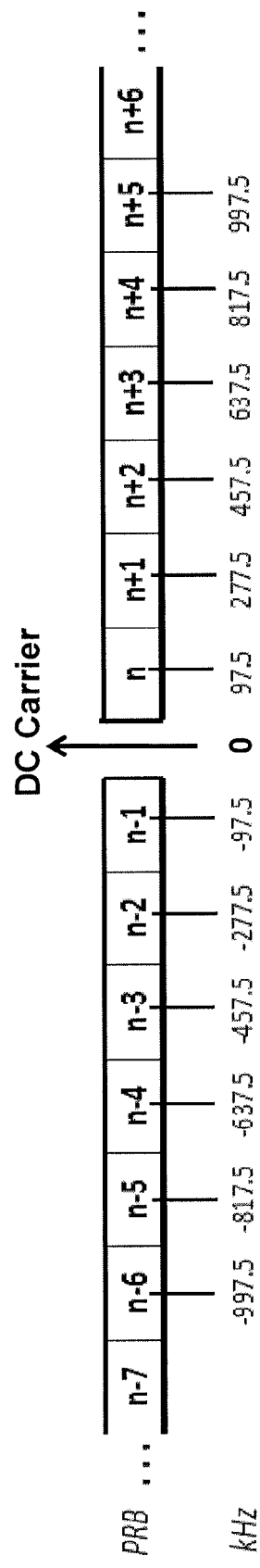
FIG. 1 illustrates the center frequency offsets of LTE PRBs for even and odd system bandwidths.
Figure 1:
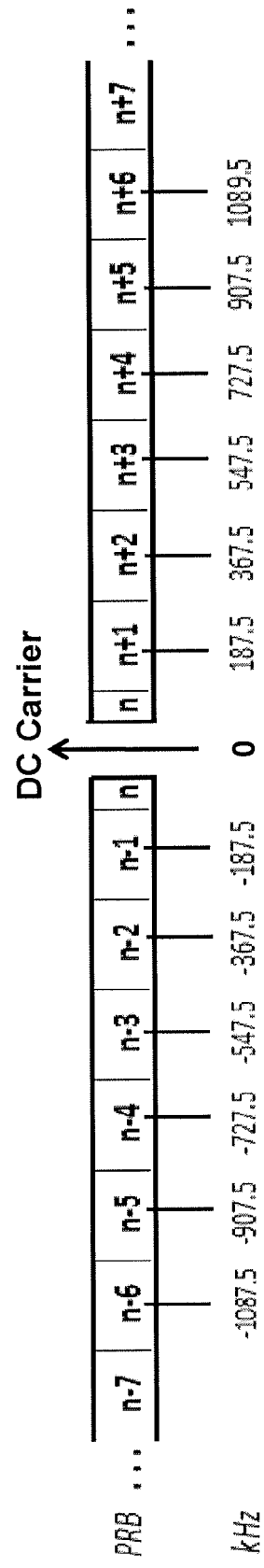
Figure 2:
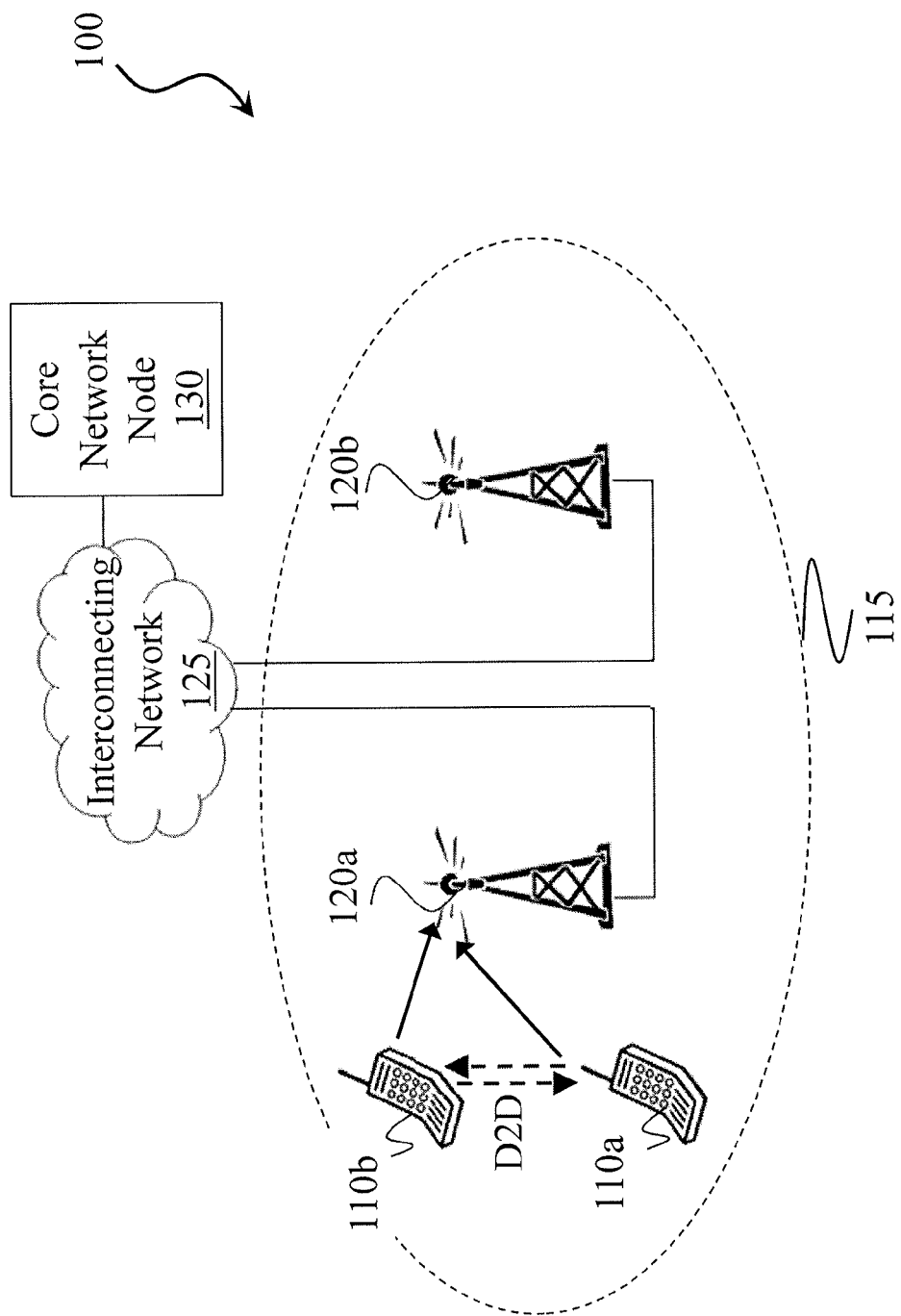
FIG. 2 is a block diagram illustrating an example of a wireless network, in accordance with certain embodiments.

FIG. 2 illustrates an example of a wireless network 100 that may be used for wireless communications. Wireless network 100 includes wireless devices 110a-110b (e.g., user equipment, UEs) and a plurality of network nodes, such as radio access nodes 120a-120b (e.g., eNBs, gNBs, etc.) connected to one or more core network nodes 130 via an interconnecting network 125. Wireless devices 110 within coverage area 115 may each be capable of communicating directly with radio access nodes 120 over a wireless interface. In certain embodiments, wireless devices may also be capable of communicating with each other via device-to-device (D2D) communication.

As an example, wireless device 110a may communicate with radio access node 120a over a wireless interface. That is, wireless device 110a may transmit wireless signals and/or receive wireless signals from radio access node 120a. The wireless signals may contain voice traffic, data traffic, control signals, and/or any other suitable information. In some embodiments, an area of wireless signal coverage associated with a radio access node 120 may be referred to as a cell.

In some embodiments wireless device 110 may be interchangeably referred to by the non-limiting term user equipment (UE). Wireless device 110 can be any type of wireless device capable of communicating with a network node or another UE over radio signals. The UE may also be radio communication device, target device, device to device (D2D) UE, machine type UE or UE capable of MTC or machine-to-machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc. An example embodiment of wireless device 110 is described in more detail below with respect to FIG. 9.

In some embodiments, generic terminology "network node" is used. It can be any kind of network node which may comprise of a radio network node such as radio access node 120 (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., mobile management entity, MME, self-organizing network node, SON node, a coordinating node, positioning node, minimization of drive test node, MDT node, etc.), or even an external node (e.g., 3rd party node, a node external to the current network), etc. The network node may also comprise test equipment. The term "radio node" may be used to denote a UE (e.g., wireless device 110) or a radio network node (e.g., radio access node 120). An example embodiment of radio access node 120 is described in more detail below with respect to FIG. 10.

In certain embodiments, radio access nodes 120 may interface with a radio network controller. The radio network controller may control radio access nodes 120 and may provide certain radio resource management functions, mobility management functions, and/or other suitable functions. In certain embodiments, the functions of the radio network controller may be included in radio access node 120. The radio network controller may interface with a core network node 130. In certain embodiments, the radio network controller may interface with the core network node 130 via an interconnecting network 125.

The interconnecting network 125 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 130 may manage the establishment of communication sessions and various other functionalities for wireless devices 110. Examples of core network node 130 may include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. Wireless devices 110 may exchange certain signals with the core network node using the non-access stratum layer. In non-access stratum signaling, signals between wireless devices 110 and the core network node 130 may be transparently passed through the radio access network. In certain embodiments, radio access nodes 120 may interface with one or more network nodes over an internode interface. For example, radio access nodes 120a and 120b may interface over an X2 interface.

Although FIG. 2 illustrates a particular arrangement of network 100, the present disclosure contemplates that the various embodiments described herein may be applied to a variety of networks having any suitable configuration. For example, network 100 may include any suitable number of wireless devices 110 and radio access nodes 120, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments are applicable to any RAT, such as Universal Mobile Telecommunications System Terrestrial Radio Access Network (UTRA), enhanced UTRA (E-UTRA), narrow band internet of things (NB-IoT), WiFi, Bluetooth, next generation RAT (NR, NX), 4G, 5G, LTE FDD/TDD, Wideband Code Division Multiple Access (WCDMA), High Speed Packet Access (HSPA), Global System for Mobile Communication (GSM), GSM Edge Radio Access Network (GERAN), WLAN, CDMA2000, etc.

Figure 3:
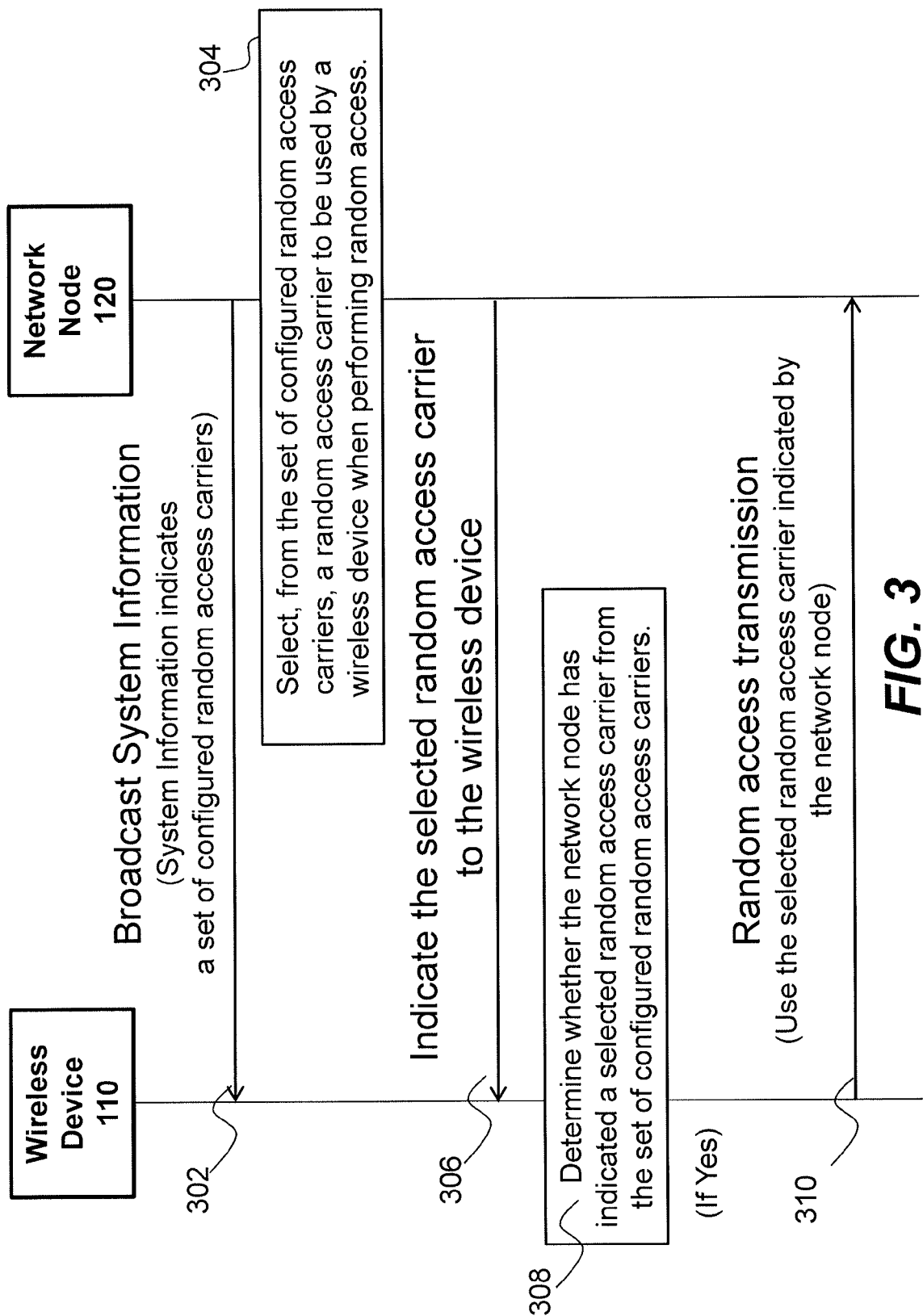
FIGS. 3-8 are signal flow diagrams illustrating examples of signals sent between a wireless device and a network node, in accordance with certain embodiments.
Figure 4A:
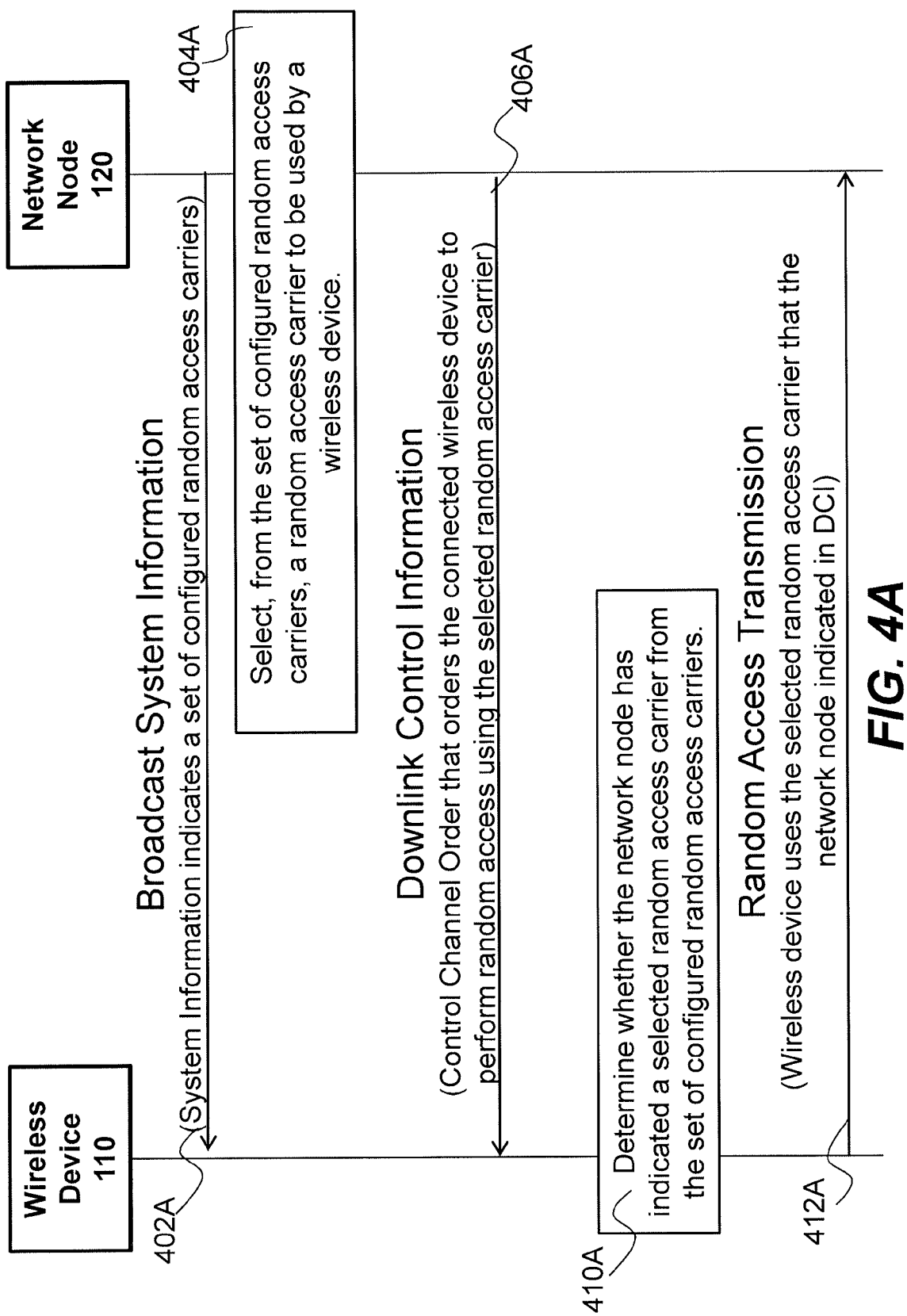
Figure 4B:
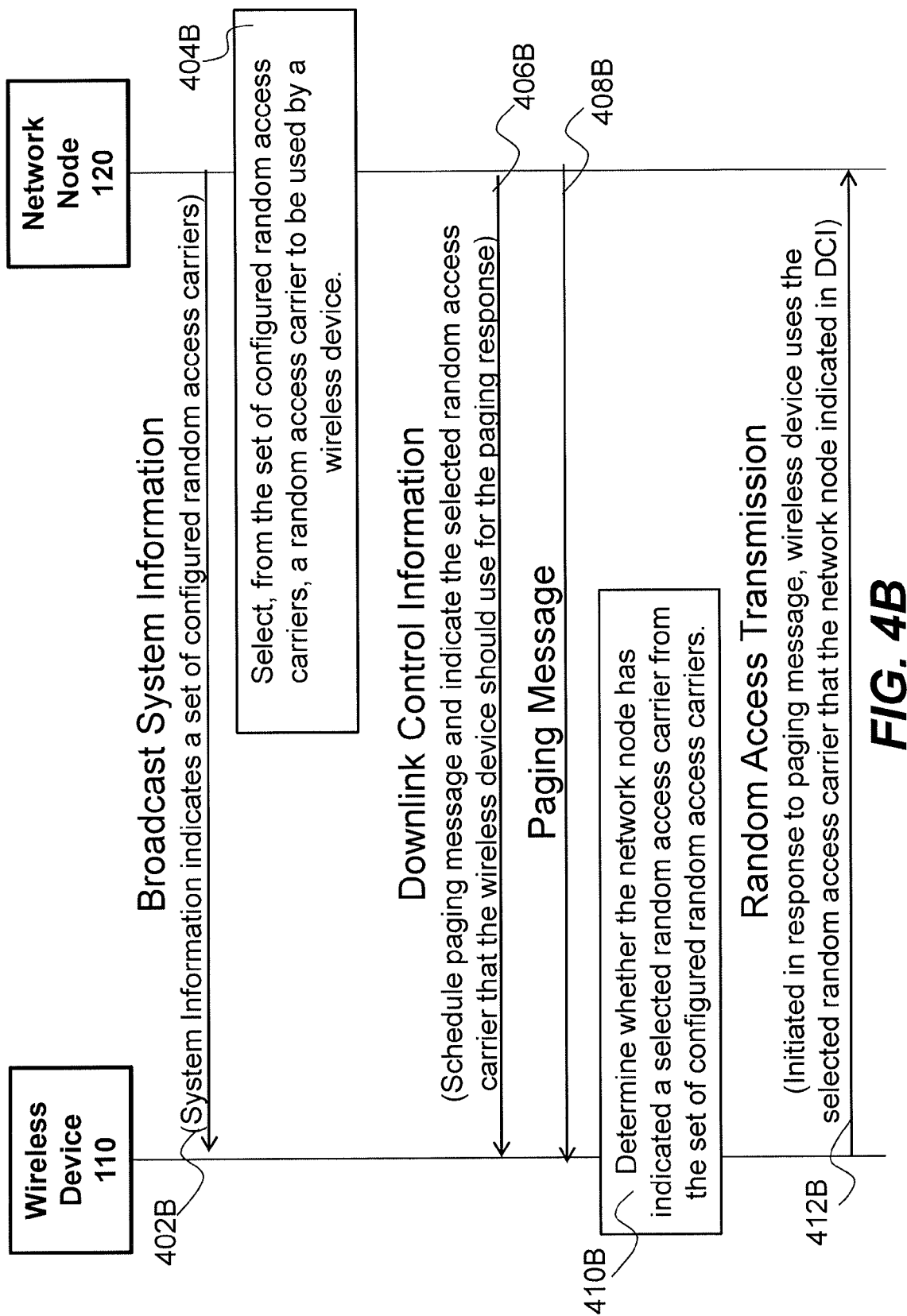
Figure 5:
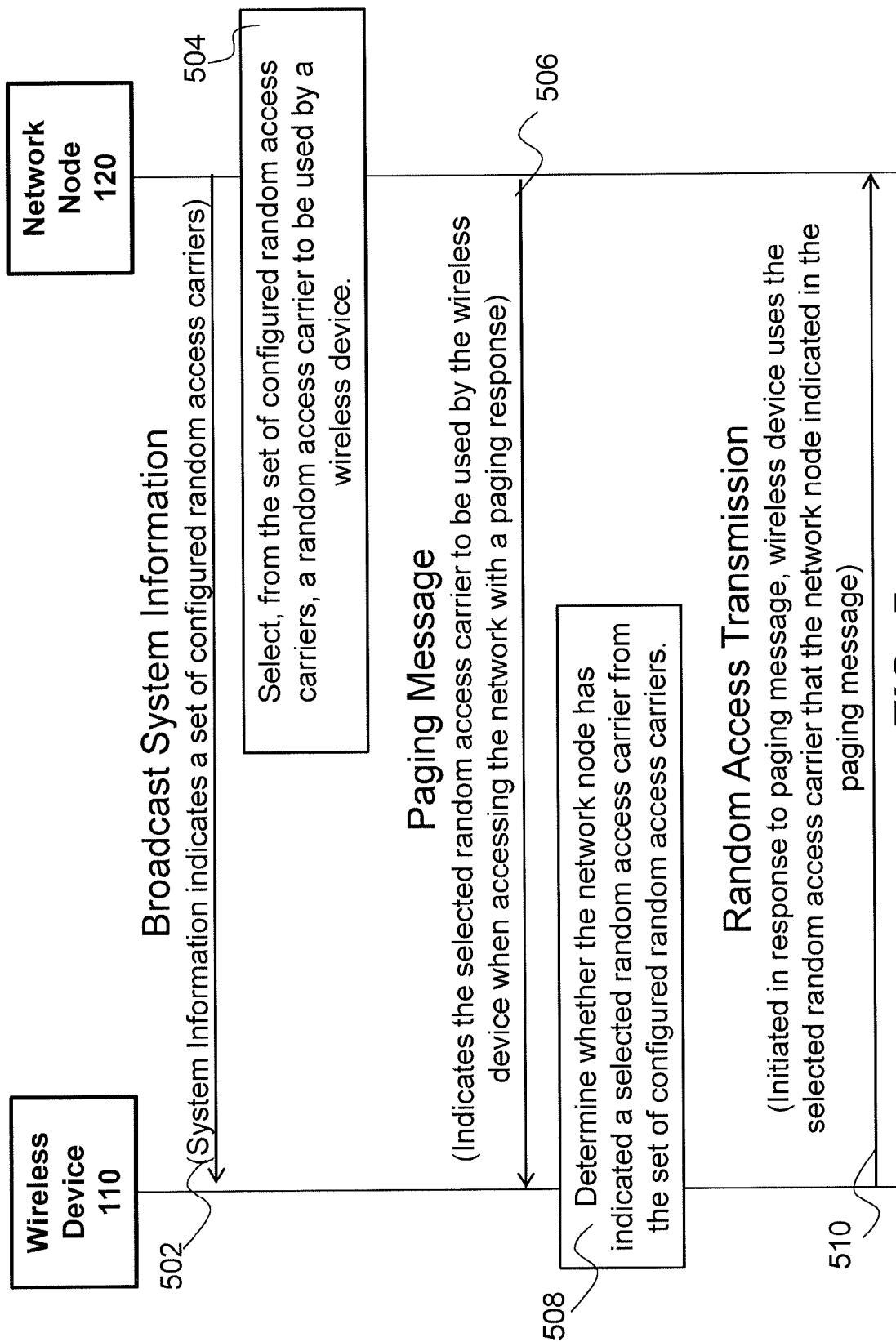
Figure 6:
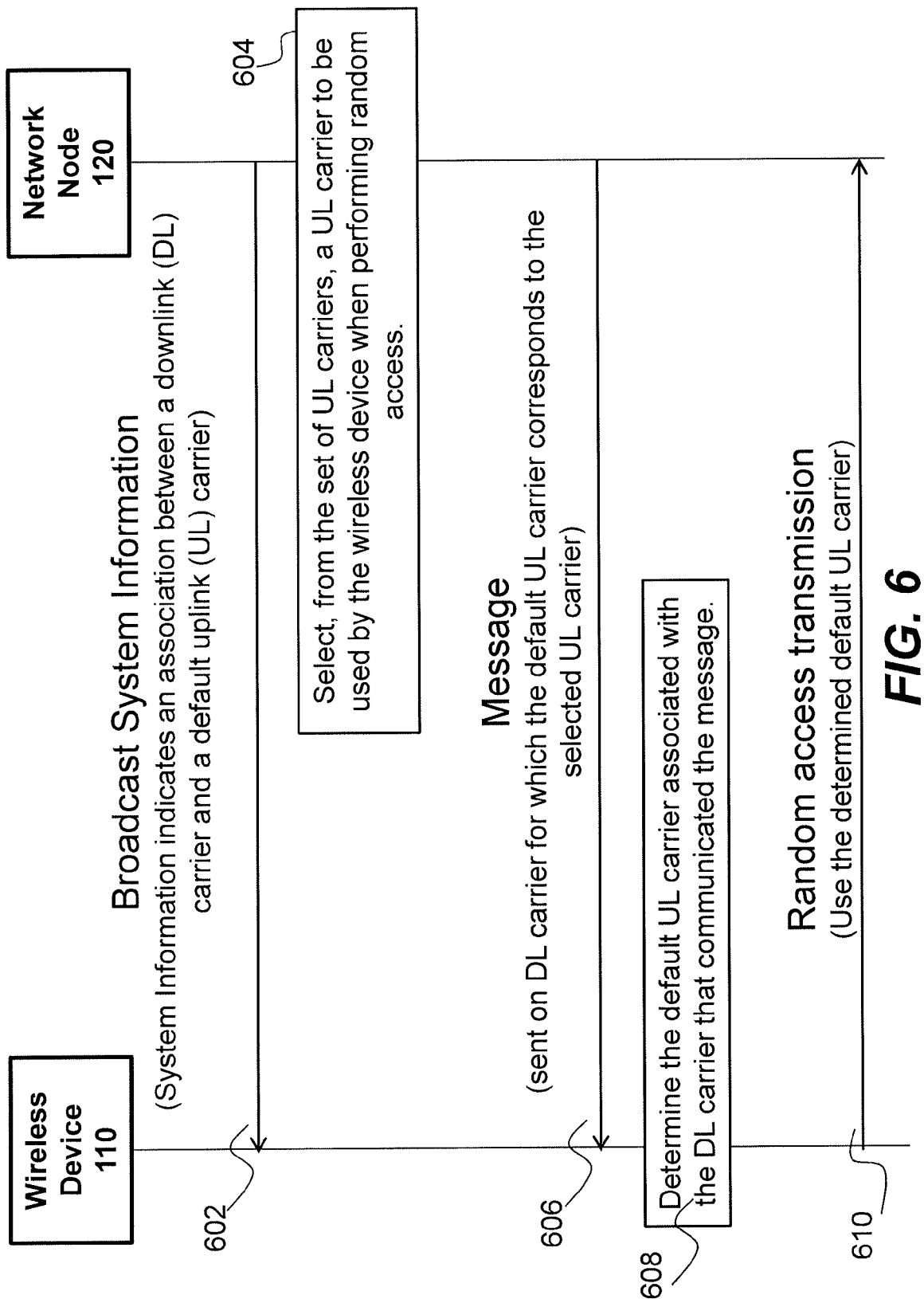
Figure 7:
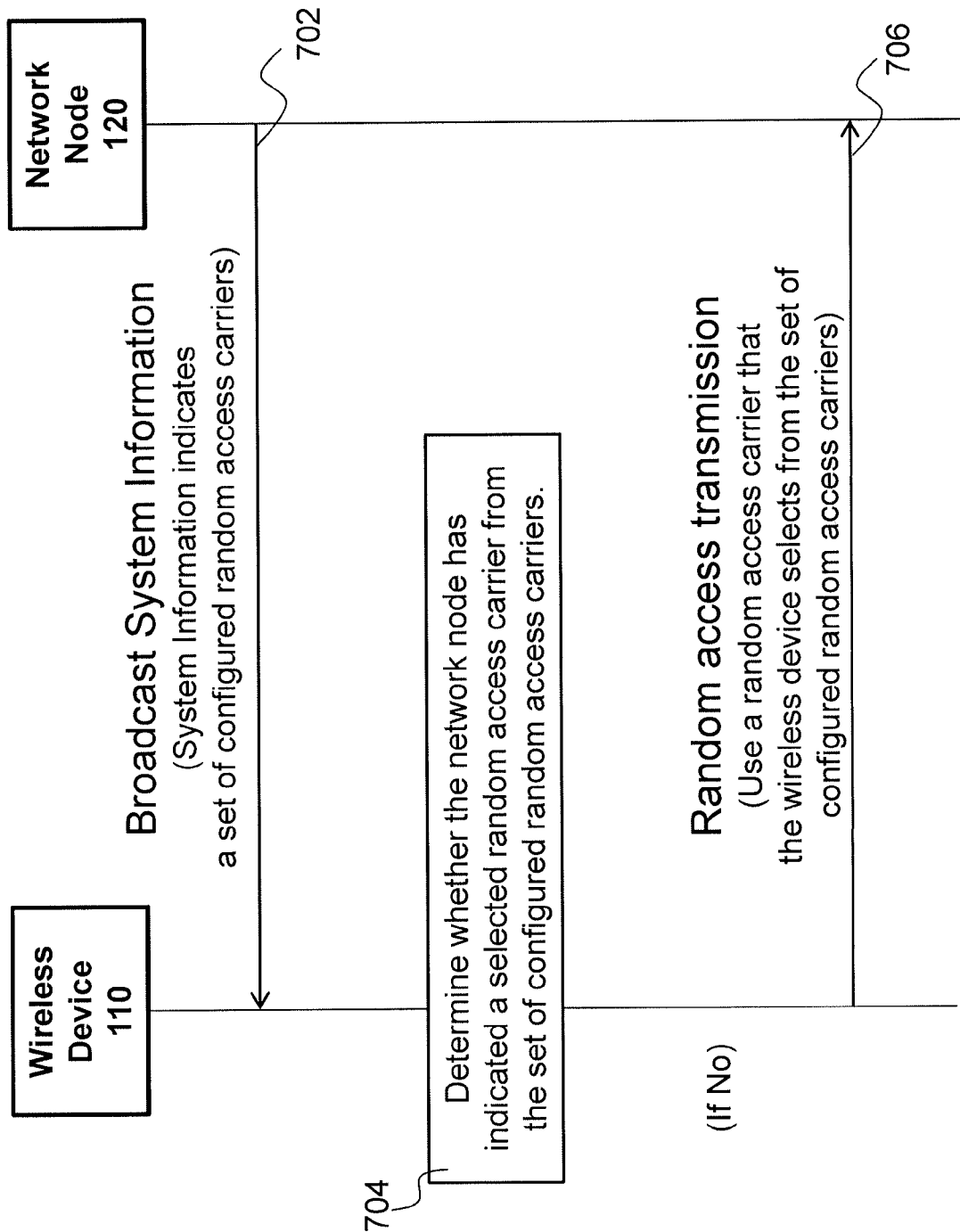
Figure 8:
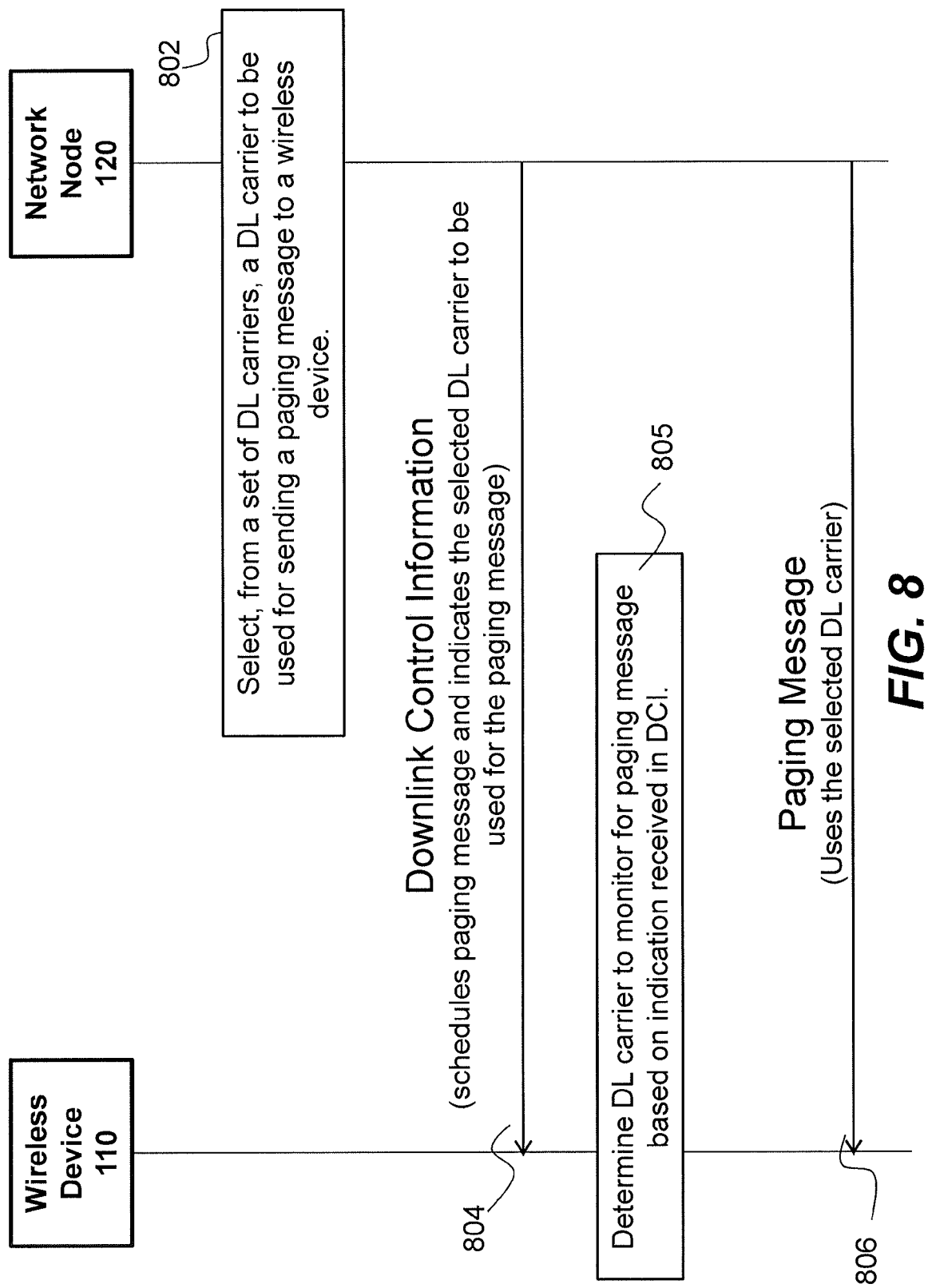

FIGS. 3-8 are signal flow diagrams illustrating examples of signals sent between a wireless device 110 and a network node, such as radio access node 120, in accordance with certain embodiments. FIG. 3 illustrates a general embodiment in which the network node indicates a random access carrier to be used by wireless device 110. FIGS. 4-6 illustrate examples implementations of the method illustrated in FIG. 3, in accordance with certain embodiments. FIG. 7 illustrates an example in which wireless device 110 selects the random access carrier in response to determining that the network node has not indicated the random access carrier. FIG. 8 illustrates an example in which the network node indicates a DL carrier to be used for a paging message.

Turning to FIG. 3, at step 302, the network node broadcasts system information to wireless devices within the coverage area of the network node. The system information indicates a set of configured random access carriers. In certain embodiments, the random access carriers support PRACHs. A PRACH may refer to a physical random access channel used by any suitable radio access technology, such as the PRACH used in LTE, the NPRACH used in NB-IoT, or future evolutions of the PRACH.

At step 304, the network node selects a random access carrier to be used by one of the wireless devices 110 when that wireless device 110 performs a random access transmission. The selected random access carrier is selected from the set of configured random access carriers broadcast by the network node in step 302. In certain embodiments, the network node determines the random access carrier to select based on a load balancing procedure that distributes the load in order to reduce the likelihood of any one of the random access carriers becoming too heavily loaded compared to the other random access carriers.

At step 306, the network node indicates the selected random access carrier to wireless device 110. The indication may be explicit or implicit. In certain embodiments the network node uses a control channel message, such as a control channel order or a scheduling message, to indicate the selected random access carrier. In certain embodiments, the control channel message is carried on a PDCCH. A PDCCH may refer to a physical downlink control channel used by any suitable radio access technology, such as the PDCCH used in LTE, the NPDCCH used in NB-IoT, or future evolutions of the PDCCH.

In certain embodiments, the control channel message explicitly indicates the selected random access carrier to wireless device 110. As an example, a control channel order may include downlink control information (DCI) that explicitly indicates the selected random access carrier to wireless device 110, as shown in FIG. 4A. As another example, a control channel message for scheduling a paging message may include DCI that explicitly indicates the selected random access carrier to be used by the wireless device when performing the random access transmission as part of a paging response, e.g., as shown in FIG. 4B. Alternatively, the control channel message may implicitly indicate the selected random access carrier, an example of which is further discussed below with respect to FIG. 6.

In addition, or in the alternative, the network node can indicate the selected random access carrier to wireless device 110 by communicating a paging message to wireless device 110. The paging message indicates the selected random access carrier to be used by wireless device 110 when performing the random access transmission that is initiated in response to the wireless device receiving the paging message, e.g., as shown in FIG. 5. In certain embodiments, the paging message is carried on a PDSCH. The PDSCH may refer to a Physical Downlink Shared Channel used by any suitable radio access technology, such as the PDSCH used in LTE, the NPDSCH used in NB-IoT, or future evolutions of the PDSCH.

At step 308, wireless device 110 determines whether the network node has indicated a selected random access carrier to be used by wireless device 110. For example, in response to receiving any of the indications discussed above with respect to step 306, wireless device determines that the network node has indicated the selected random access carrier.

At step 310, in response to determining that the network node has indicated the selected random access carrier, wireless device 110 performs a random access transmission using the selected random access carrier indicated by the network node. As an example, if wireless device 110 is initiating an access attempt in response to a control channel order, wireless device 110 transmits the random access message via the random access carrier indicated by the network node in the control channel (see e.g., FIG. 4A). As another example, if wireless device 110 is responding to a paging message, wireless device 110 initiates the random access transmissions via the random access carrier selected by the network node (see e.g., FIGS. 4B-5).

FIGS. 4A-4B illustrate examples in which the network node indicates a random access carrier to be used by wireless device 110. In these examples, the network node sends downlink control information (DCI) to wireless device 110 in order to explicitly indicate the selected random access carrier.

With respect to FIG. 4A, at step 402A, the network node broadcasts system information that indicates a set of configured random access carriers. At step 404A, the network node selects a random access carrier to be used by a wireless device 110. The selected random access carrier is selected from the set of configured random access carriers broadcast in step 402A. At step 406A, the network node sends wireless device 110 a message, such as a control channel message sent via a PDCCH. For example, the message sent in step 406A may be a control channel order (e.g., PDCCH order) sent to a connected wireless device 110 and ordering the wireless device 110 to perform a random access procedure. The control channel order includes DCI explicitly indicating the selected random access carrier that wireless device 110 should use for the random access transmissions. At step 410A, wireless device 110 determines whether the network node has indicated a selected random access carrier. For example, wireless device 110 determines that the network node has indicated the selected random access carrier based on wireless device 110 having received the indication in step 406A. At step 412A, wireless device 110 performs the random access transmissions using the selected random access carrier that the network node indicated in step 406A.

With respect to FIG. 4B, at step 402B, the network node broadcasts system information that indicates a set of configured random access carriers. At step 404B, the network node selects a random access carrier to be used by a wireless device 110. The selected random access carrier is selected from the set of configured random access carriers broadcast in step 402B. At step 406B, the network node sends wireless device 110 a message, such as a control channel message sent via a PDCCH. For example, the message sent in step 406B may be a scheduling message sent to an idle wireless device 110 to schedule a paging message. The scheduling message includes DCI that explicitly indicates the selected random access carrier that wireless device 110 should use when initiating the random access transmissions in response to receiving the paging message. At step 408B, the network node sends the paging message, e.g., via a PDSCH. At step 410B, wireless device 110 determines whether the network node has indicated a selected random access carrier for initiating a random access transmission in response to receiving a paging message. For example, wireless device 110 determines that the network node has indicated the selected random access carrier based on wireless device 110 having received the indication in step 406B. At step 412B, wireless device 110 initiates the random access transmission using the selected random access carrier that the network node indicated in step 406B.

FIG. 5 illustrates another example in which the network node indicates a random access carrier to be used by wireless device 110. At step 502, the network node broadcasts system information that indicates a set of configured random access carriers. At step 504, the network node selects a random access carrier to be used by a wireless device 110. The selected random access carrier is selected from the set of configured random access carriers broadcast in step 502. At step 506, the network node sends a paging message. The paging message may be sent via a PDSCH. The paging message indicates the selected random access carrier that wireless device 110 should use when responding to the paging message. At step 508, wireless device 110 determines whether the network node has indicated a selected random access carrier for performing the random access transmission that is initiated in response to the wireless device receiving the paging message. For example, wireless device 110 determines that the network node has indicated the selected random access carrier based on wireless device 110 having received the indication in step 506. At step 510, wireless device 110 uses the selected random access carrier that the network node indicated in step 506 when performing the random access transmission that is initiated in response to the wireless device receiving the paging message.

FIG. 6 illustrates an example in which the network node implicitly indicates a random access carrier to be used by wireless device 110. At step 602, the network node broadcasts system information that indicates a set of downlink carriers (e.g., anchor carrier and non-anchor carriers) and a set of uplink carriers (e.g., anchor carrier and non-anchor carriers). The downlink carriers may be used for paging wireless devices and/or other downlink procedures. The uplink carriers may be used for random access transmissions and/or other uplink procedures. In certain embodiments, the system information broadcast in step 602 includes information about the association between a DL carrier and a respective default UL carrier.

At step 604, the network node selects a UL carrier to be used by the wireless device 110 when performing an uplink procedure, such as a random access attempt. The UL carrier is selected from the set of UL carriers indicated in the system information broadcast by the network node in step 602.

At step 606, the network node indicates the selected UL carrier to wireless device 110 by transmitting a message on a DL carrier. The network node implicitly indicates the selected UL carrier by communicating a message (such as a control channel order, scheduling message, or paging message) to wireless device 110 on the DL carrier for which the associated default UL carrier corresponds to the UL carrier selected in step 604.

At step 608, wireless device 110 determines whether the network node has indicated a selected UL carrier. For example, wireless device 110 determines that the network node has indicated a selected UL carrier based on wireless device 110 having received a message in step 606 via a DL carrier that the system information received in step 602 associates with a default UL carrier.

At step 610, wireless device performs an uplink procedure, such as transmitting a random access transmission, using the default UL carrier (i.e., the UL carrier associated with the DL carrier that communicated the message in step 606).

Although the previous example describes the network node selecting the UL carrier in step 604, in an alternative embodiment, the network node may simply select the DL carrier. The subsequent steps would be similar (the network node sends message 606 via the selected DL carrier, and in step 608 wireless device 110 determines the associated default UL carrier based on the association received in the system information broadcast by the network node in step 602).

FIG. 7 illustrates an example in which wireless device 110 selects the random access carrier in response to determining that the network node has not indicated the random access carrier. At step 702, wireless device 110 receives system information being broadcast by a the network node. The system information indicates a set of configured random access carriers supported by the network node. At step 704, wireless device 110 determines whether the network node has indicated a selected random access carrier from the set of configured random access carriers. At step 706, in response to determining that the network node has not indicated the selected random access carrier (e.g., if wireless device did not receive any of indication 306, 406A, 406B, 506, or 606 discussed above), wireless device 110 performs the random access transmission using a random access carrier that wireless device 110 selects itself. Wireless device 110 selects the random access carrier from the set of configured random access carriers identified in the system information that the network node broadcast in step 702.

FIG. 8 illustrates an example in which the network node indicates a DL carrier to be used for a paging message. At step 802, the network node selects a DL carrier for sending a paging message to a wireless device. The selected DL carrier is selected from a set of configured DL carriers. In certain embodiments, the network node selects the DL carrier based on a load balancing procedure that distributes the load in order to reduce the likelihood of any one of the DL carriers becoming too heavily loaded compared to the other DL carriers. At step 804, the network node sends DCI to wireless device 110. For example, the DCI may be sent via a PDCCH. The DCI schedules the paging message and indicates the selected DL carrier for the paging message. At step 805, wireless device 110 determines to monitor the selected DL carrier for the paging message based on the indication received in step 804. At step 806, the network node sends the paging message to wireless device 110 on the selected DL carrier (the DL carrier indicated in step 804). For example, the paging message may be carried on a PDSCH.

As discussed above, embodiments of the present disclosure may be used with any suitable radio access technology. Certain embodiments of the present disclosure propose methods for the network to better utilize the UL NPRACH resources when NPRACH resources are configured on non-anchor carriers. Currently (i.e. in the rel-13 version of the NB-IoT specifications), when an NB-IoT UE is paged, there is no way for it to determine which UL carrier to use to send its NPRACH. Therefore, if there is no good mechanism to distribute the NPRACH load, some of the UL carriers may be overloaded. Therefore, the present disclosure proposes several solutions for the network to better distribute the UL PRACH load. U.S. Patent Application 62/374,305 provides a few variants of load distribution based on UE selection by using rules and parameters broadcasted on system information. Disclosed herein is more direct dedicated signaling from the NW to individual UEs.

In certain embodiments, the general idea is when an NB-IoT UE is sent a message on the NPDCCH being a "paging scheduling" message (DCI message scrambled by P-RNTI), a paging message (the paging message on the NPDSCH being scheduled by previous said P-RNTI scrambled DCI on NPDCCH), or a NPDCCH order (DCI message scrambled by C-RNTI), an indication can be provided which UL carrier that the UE shall use to send it's NPRACH Msg1.

In a first embodiment, a PDCCH order indicates the NPRACH carrier. For example, as discussed with respect to FIG. 3, a new DCI format on NPDCCH (i.e., a "PDCCH order") orders the UE to perform a random access transmission on any NPRACH carrier broadcasted on SI. If the PDCCH order explicitly points out an NPRACH carrier, the UE shall use that one (see e.g., FIG. 3), otherwise the idle mode NPRACH carrier selection is performed by the UE (see e.g., FIG. 7). Also, as discussed above with respect to FIG. 6, it is also possible to associate a default UL non-anchor carrier with each DL non-anchor carrier. So, when the NPDCCH order is received on one carrier, the NPRACH is sent on the default associated UL carrier.

In a second embodiment, a paging DCI indicates the NPRACH carrier. For example, a new DCI format on NPDCCH that schedules a paging message also includes indication to what NPRACH carrier the UE should use in the random access transmission that is part of a paging response. An example of this embodiment is discussed above with respect to FIG. 4.

In a third embodiment, a paging DCI indicates the paging message carrier. For example, a new DCI format on NPDCCH that schedules a paging message also includes indication about the DL carrier used for the paging message (on NPDSCH). An example of this embodiment is discussed above with respect to FIG. 8.

In a fourth embodiment, a paging message indicates a NPRACH carrier. For example, instead of as in embodiment 2 which indicates the NPRACH carrier on the NPDCCH, this embodiment includes the NPRACH carrier in the paging message transmitted on NPDSCH. An example of this embodiment is discussed above with respect to FIG. 5.

In certain embodiments, the DL and UL non-anchor carrier information is broadcast in the SI. Additionally, in certain embodiments, the default DL and UL non-anchor carrier association is broadcast on the SI. FIG. 6 illustrates an example.

In certain embodiments, in addition to the UL non-anchor carrier, the network node can also indicate the specific NPRACH resource, if multiple NPRACH resources are configured on a non-anchor carrier.

In certain embodiments, a method in a network node comprises indicating to a wireless device an NPRACH carrier to be used by the wireless device when performing random access transmissions.

In certain embodiments, a network node comprises memory and one or more processors. The network node is operable to indicate to a wireless device an NPRACH carrier to be used by the wireless device when performing random access transmissions.

In certain embodiments, a computer program product comprises a non-transitory computer readable storage medium having computer readable program code embodied in the medium. The computer readable program code comprises computer readable program code to indicate to a wireless device an NPRACH carrier to be used by the wireless device when performing random access transmissions.

In certain embodiments, a method in wireless device comprises receiving from a network node an indication of an NPRACH carrier to be used by the wireless device when performing random access transmissions, and using the indicated NPRACH carrier when performing the random access transmission.

In certain embodiments, a wireless device comprises memory and one or more processors. The wireless device is operable to receive from a network node an indication of an NPRACH carrier to be used by the wireless device when performing random access transmissions, and to use the indicated NPRACH carrier when performing the random access transmission.

In certain embodiments, a computer program product comprises a non-transitory computer readable storage medium having computer readable program code embodied in the medium. The computer readable program code comprises computer readable program code to receive from a network node an indication of an NPRACH carrier to be used by a wireless device when performing random access transmissions, and computer readable program code to use the indicated NPRACH carrier when performing the random access transmission.

Figure 9:
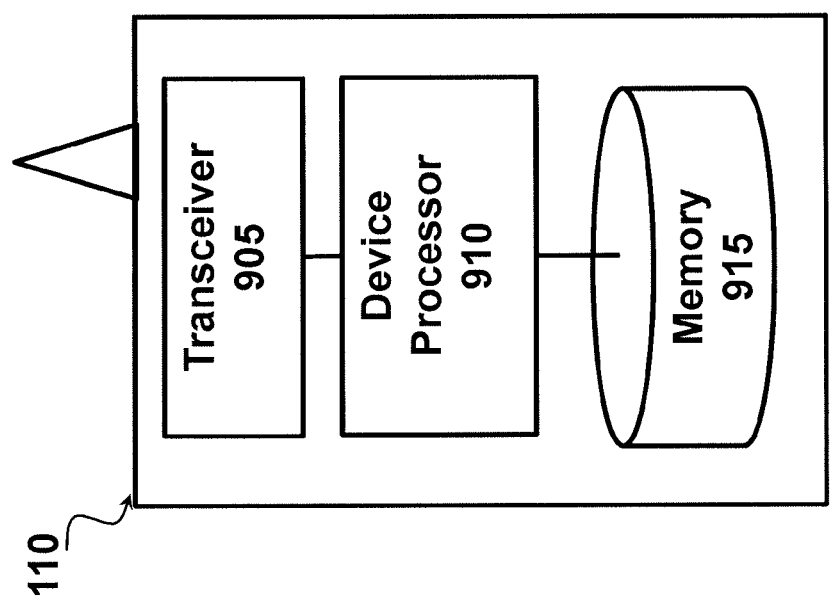
FIG. 9 is a block diagram illustrating an example of a wireless device, in accordance with certain embodiments.

FIG. 9 is a block diagram of an exemplary wireless device 110, in accordance with certain embodiments. Wireless device 110 includes one or more transceivers 905, processing circuitry (which may comprise one or more processors 910), and one or more memories 915. In some embodiments, transceiver 905 facilitates transmitting wireless signals to and receiving wireless signals from radio access node 120 (e.g., via an antenna), processor 910 executes instructions to provide some or all of the functionality described above as being provided by wireless device 110, and memory 915 stores the instructions for execution by processor 910.

Processor 910 may include any suitable combination of hardware and software implemented in one or more modules to execute instructions and manipulate data to perform some or all of the described functions of wireless device 110, such as the functions of determining whether the network node has indicated a selected random access carrier to be used by wireless device 110 (as described above with respect to FIGS. 3-7) or determining whether the network node has indicated a selected DL carrier to be used for a paging message (as described above with respect to FIG. 8). In some embodiments, processor 910 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 915 is generally operable to store instructions, such as a computer program, software, an application including one or more of logic, rules, algorithms, code, tables, etc. and/or other instructions capable of being executed by a processor. Examples of memory 915 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 910 of wireless device 110.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of processor 910. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
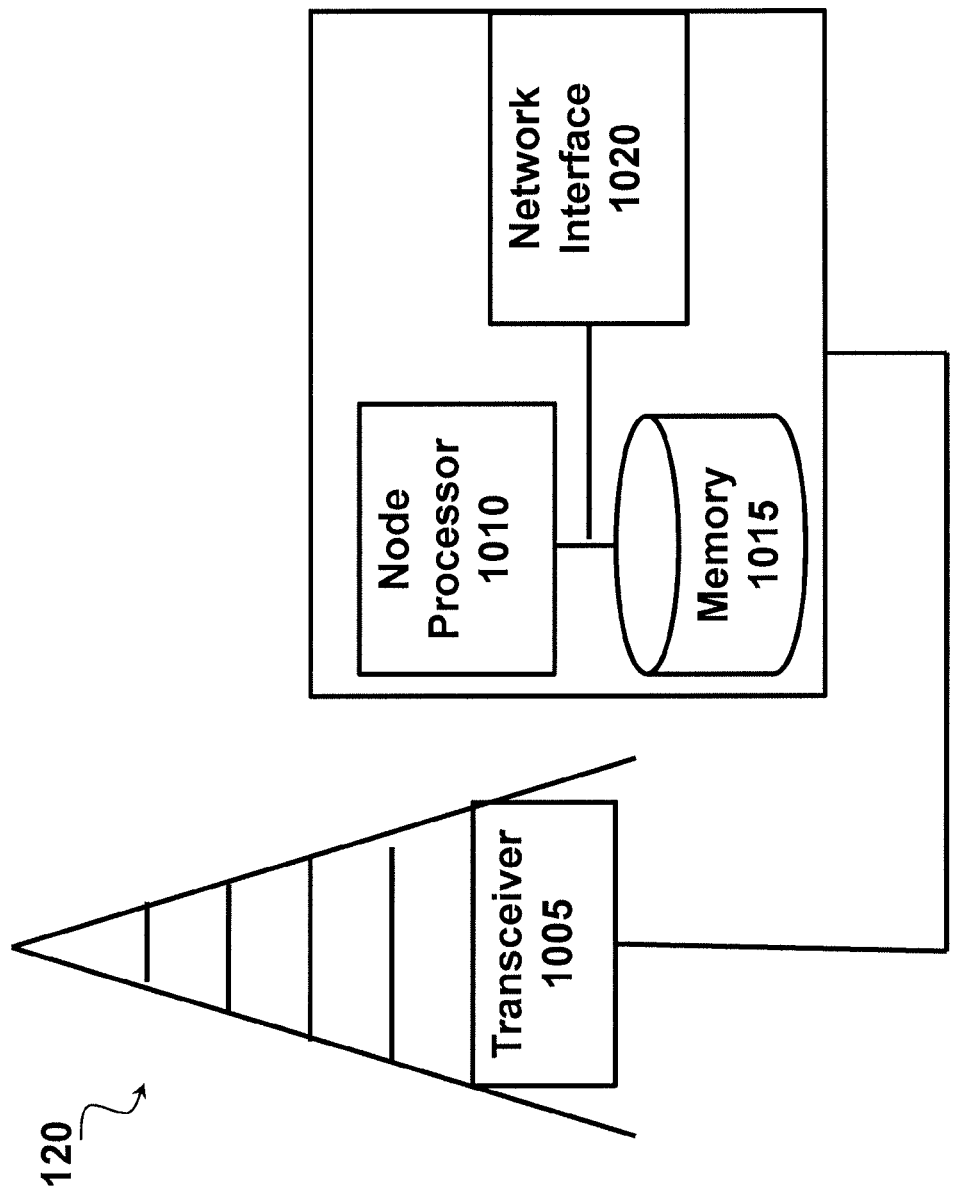
FIG. 10 is a block diagram illustrating an example of a network node, in accordance with certain embodiments.

FIG. 10 is a block diagram of an exemplary radio access node 120, in accordance with certain embodiments. Radio access node 120 may include one or more of transceiver(s) 1005, processing circuitry (which may comprise one or more processors 1010), memory(ies) 1015, and network interface(s) 1020. In some embodiments, transceiver 1005 facilitates transmitting wireless signals to and receiving wireless signals from wireless device 110 (e.g., via an antenna), processor 1010 executes instructions to provide some or all of the functionality described above as being provided by a network node or radio access node 120, memory 1015 stores the instructions for execution by processor 1010, and network interface 1020 communicates signals to backend network components, such as a gateway, switch, router, Internet, Public Switched Telephone Network (PSTN), core network nodes or radio network controllers, etc.

Processor 1010 may include any suitable combination of hardware and software implemented in one or more modules to execute instructions and manipulate data to perform some or all of the described functions of a network node or radio access node 120, such as indicating a selected random access carrier to be used by wireless device 110 (as described above with respect to FIGS. 3-7) or indicating a selected DL carrier to be used for a paging message (as described above with respect to FIG. 8). In some embodiments, processor 1010 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1015 is generally operable to store instructions, such as a computer program, software, an application including one or more of logic, rules, algorithms, code, tables, etc. and/or other instructions capable of being executed by a processor. Examples of memory 1015 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1020 is communicatively coupled to processor 1010 and may refer to any suitable device operable to receive input for radio access node 120, send output from radio access node 120, perform suitable processing of the input or output or both, communicate to other devices, or any combination of the preceding. Network interface 1020 may include appropriate hardware (e.g., port, modem, network interface card, etc.) and software, including protocol conversion and data processing capabilities, to communicate through a network.

Other embodiments of radio access node 120 may include additional components beyond those shown in FIG. 10 that may be responsible for providing certain aspects of the radio network node's functionality, including any of the network node functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 9-10 may be included in other network nodes (such as core network node 130). Other network nodes may optionally include or not include a wireless interface (such as the transceiver described in FIGS. 9-10).

Figure 11:
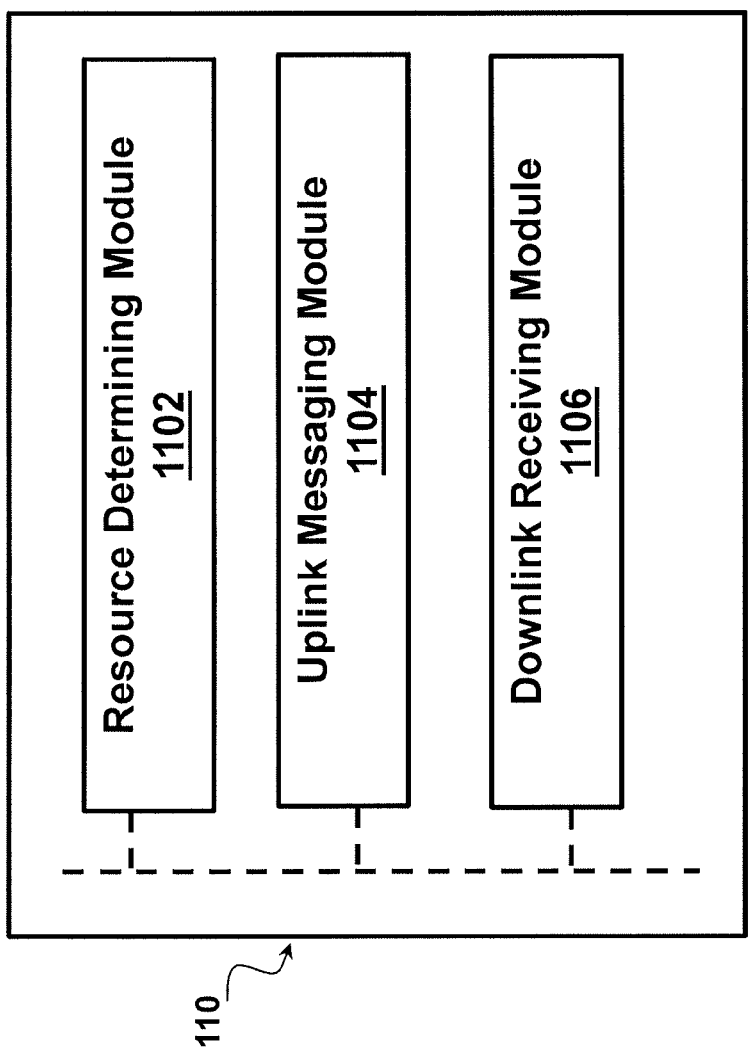
FIG. 11 is a block diagram illustrating an example of components of a wireless device, in accordance with certain embodiments.

FIG. 11 illustrates examples of modules that may be included in wireless device 110. For example, wireless device 110 may include a resource determining module 1102, an uplink messaging module 1104, and/or a downlink receiving module 1106. Resource determining module 1102 may determine a random access carrier to use for a random access transmission. For example, resource determining module 1102 may be configured to perform one or more of steps 308, 410A, 410B, 508, 608, and/or 704 discussed above with respect to FIGS. 3, 4A, 4B, 5, 6, and 7, respectively. Thus, the determination can be based on an indication from a the network node or, if the network node does not indicate which random access carrier to use, wireless device 110 may decide on its own. The network node can indicate the random access carrier in any suitable message, such as a message comprising DCI information (such as a control channel order or a message scheduling a paging message), a paging message, and so on. Uplink messaging module 1104 sends random access messages using the random access carrier determined by resource determining module 1102. For example, uplink messaging module 1104 may be configured to perform one or more of steps 310, 412A, 412B, 510, 610, and/or 706 discussed above with respect to FIGS. 3, 4A, 4B, 5, 6, and 7, respectively.

In certain embodiments, downlink receiving module 1106 may receive signals from the network node, such as signals 302 and/or 306 of FIG. 3, signals 402A and/or 406A of FIG. 4A, signals 402B, 406B, and/or 408B of FIG. 4B, signals 502 and/or 506 of FIG. 5, signals 602 and/or 606 of FIG. 6, signal 702 of FIG. 7, and/or signals 804 and/or 806 of FIG. 8. In an embodiment, resource determining module 1102 may determine a DL carrier to use to receive a paging message (step 805) based on DCI received by downlink receiving module 1106 in step 804.

In certain embodiments, resource determining module 1102, uplink messaging module 1104, and/or downlink receiving module are implemented using one or more processors 910 discussed with respect to FIG. 9. The modules may be integrated or separated in any manner suitable for performing the described functionality.

Figure 12:
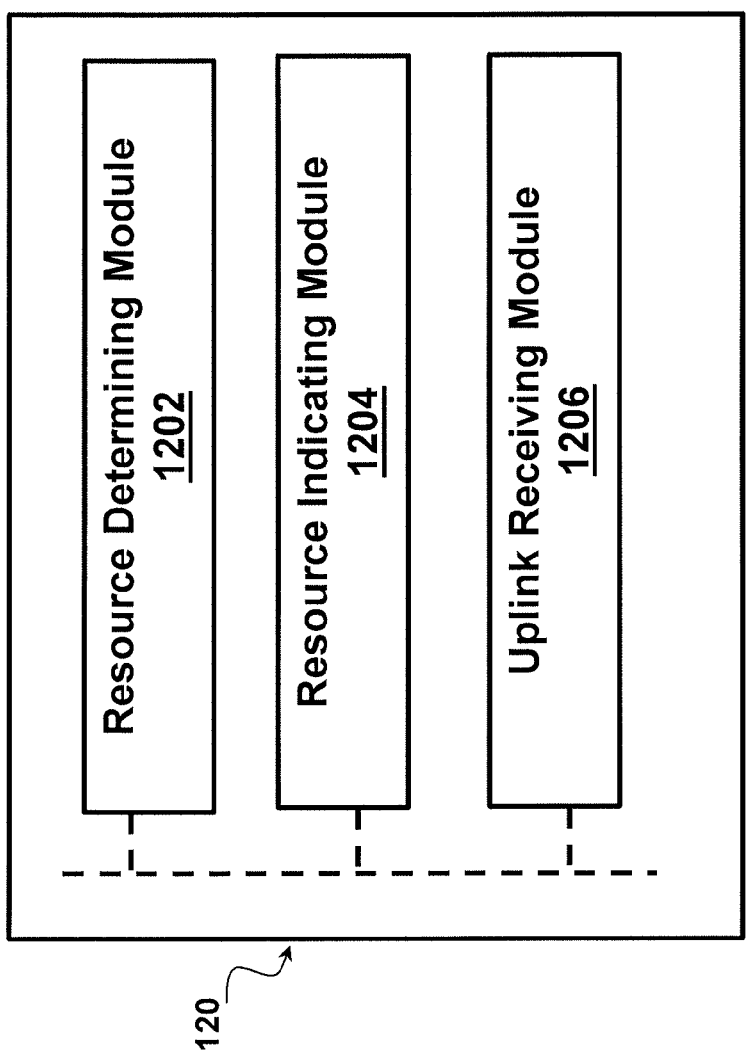
FIG. 12 is a block diagram illustrating components of a network node, in accordance with certain embodiments.

FIG. 12 illustrates examples of modules that may be included in radio access node 120. For example, radio access node 120 may include a resource determining module 1202, a resource indicating module 1204, and/or a uplink receiving module 1206. Resource determining module 1202 may determine a random access carrier to be used by respective wireless device(s) 110 or a DL carrier to be used to send paging messages to respective wireless device(s) 110. As one example, resource determining module 1202 may determine the random access carrier at least in part to balance the utilization of random access carriers in order to avoid a large number of wireless devices 110 all attempting to use the same random access carriers. In certain embodiments, resource determining module 1202 may be configured to perform one or more of steps 304, 404A, 404B, 504, 604, and/or 802 discussed above with respect to FIGS. 3, 4A, 4B, 5, 6, and 8, respectively.

Resource indicating module 1204 indicates the determined carrier to the wireless device(s) 110. Resource indicating module 1204 can cause the network node to indicate the carrier in any suitable message, such as a message comprising DCI information (such as a message scheduling a paging message or a control channel order), a paging message, and so on. In certain embodiments, resource indicating module 1204 may be configured to perform one or more of steps 306, 406A, 406B, 506, 606, or 804 discussed above with respect to FIGS. 3, 4A, 4B, 5, 6, and 8, respectively.

Uplink receiving module 1206 receives messages from wireless device 110. For example, uplink receiving module 1206 may receive the random access transmissions via the random access carrier selected by resource determining module 1202 and communicated by resource indicating module 1204. Examples of messages that may be received by uplink receiving module include messages of steps 310, 412A, 412B, 510, 610, and/or 706 of FIGS. 3, 4A, 4B, 5, 6, and 7, respectively.

In certain embodiments, resource determining module 1202, resource indicating module 1204, and/or uplink receiving module 1206 are implemented using one or more processors discussed with respect to FIG. 10. The modules may be integrated or separated in any manner suitable for performing the described functionality.

Any two or more embodiments described in this document may be combined in any way with each other. Furthermore, the described embodiments are not limited to the described radio access technologies (e.g., LTE, NB-IoT, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for use in a network node, the method comprising:
broadcasting system information that indicates a set of configured random access carriers, the set of configured random access carriers comprises at least one non-anchor carrier;
selecting a random access carrier to be used by a wireless device when performing random access transmissions, the selected random access carrier associated with a non-anchor carrier selected from the set of configured random access carriers; and
indicating the selected random access carrier to the wireless device on a non-anchor carrier, wherein indicating the selected random access carrier comprises communicating downlink control information (DCI) that explicitly indicates the selected random access carrier to the wireless device, the DCI communicated via a control channel.

2. The method of claim 1, wherein the control channel comprises a physical downlink control channel (PDCCH).

3. The method of claim 2, wherein the PDCCH comprises a Narrowband PDCCH (NPDCCH).

4. The method of claim 1, wherein the DCI is communicated in a control channel order.

5. The method of claim 4, wherein the control channel order comprises a PDCCH order or an NPDCCH order, is sent to the wireless device in connected mode, and orders the wireless device to perform a random access transmission on the random access carrier.

6. The method of claim 1, wherein the DCI is communicated in a scheduling message, wherein the scheduling message schedules a paging message and indicates the selected random access carrier to be used by the wireless device when performing the random access transmission that is initiated in response to the wireless device receiving the paging message.

7. The method of claim 6, wherein the scheduling message is sent to the wireless device in idle mode, and wherein the scheduling message comprises an index indicating the selected random access carrier.

8. The method of claim 1, wherein indicating the selected random access carrier to the wireless device comprises communicating a paging message via a Physical Downlink Shared Channel (PDSCH), wherein the paging message indicates the selected random access carrier to be used by the wireless device when performing the random access transmission that is initiated in response to the wireless device receiving the paging message.

9. The method of claim 8, wherein the PDSCH comprises a Narrowband PDSCH (NPDSCH).

10. The method of claim 1, wherein the system information broadcast by the network node provides information about downlink (DL) carriers and uplink (UL) carriers, the UL carriers belonging to the set of configured random access carriers.

11. The method of claim 10, wherein the information about the carriers indicates an association between one of the DL carriers and a default UL carrier.

12. The method of claim 11, wherein indicating the selected random access carrier to the wireless device comprises communicating a message via one of the DL carriers, wherein communicating the message via that DL carrier implicitly indicates for the wireless device to perform the random access transmission using the default UL carrier associated with the DL carrier that communicated the message.

13. The method of claim 1, wherein the random access carrier comprises a Narrowband Physical Random Access Channel (NPRACH) carrier.

14. A method for use in a wireless device, the method comprising:
receiving system information being broadcast by a network node, wherein the system information indicates a set of configured random access carriers supported by the network node, the set of configured random access carriers comprises at least one non-anchor carrier;
determining whether the network node has indicated a selected random access carrier on a non-anchor carrier from the set of configured random access carriers;
in response to determining that the network node has indicated the selected random access carrier, performing the random access transmission using the selected random access carrier indicated by the network node; and
in response to determining that the network node has not indicated the selected random access carrier, performing the random access transmission using a random access carrier that the wireless device selects from the set of configured random access carriers.

15. The method of claim 14, further comprising determining that the network node has indicated the selected random access carrier based on receiving a downlink control information (DCI) from the network node that explicitly indicates the selected random access carrier to the wireless device, the DCI received via a control channel.

16. The method of claim 15, wherein the control channel comprises a physical downlink control channel (PDCCH).

17. The method of claim 16, wherein the PDCCH comprises a Narrowband PDCCH (NPDCCH).

18. The method of claim 15, wherein the DCI is communicated in a control channel order.

19. The method of claim 18, wherein the control channel order comprises a PDCCH order or an NPDCCH order, is received by the wireless device in connected mode, and orders the wireless device to perform a random access transmission.

20. The method of claim 15, wherein the DCI is received via a scheduling message that schedules a paging message and indicates the selected random access carrier to be used by the wireless device when performing the random access transmission that is initiated in response to the wireless device receiving the paging message.

21. The method of claim 20, wherein the scheduling message is received by the wireless device in idle mode, and wherein the scheduling message comprises an index indicating the selected random access carrier.

22. The method of claim 14, further comprising determining that the network node has indicated the selected random access carrier based on receiving a paging message from the network node via a Physical Downlink Shared Channel (PDSCH), wherein the paging message indicates the selected random access carrier to be used by the wireless device when performing the random access transmission that is initiated in response to the wireless device receiving the paging message.

23. The method of claim 22, wherein the PDSCH comprises a Narrowband PDSCH (NPDSCH).

24. The method of claim 14, wherein the system information broadcast by the network node provides information about downlink (DL) carriers and uplink (UL) carriers, the UL carriers belonging to the set of configured random access carriers.

25. The method of claim 24, wherein the information about the carriers indicates an association between one of the DL carriers and a default UL carrier.

26. The method of claim 25, further comprising:
receiving a message via one of the DL carriers;
determining a default UL carrier associated with the DL carrier that communicated the message; and
performing the random access transmission using the default UL carrier.

27. The method of claim 14, wherein the selected random access carrier comprises a Narrowband Physical Random Access Channel (NPRACH) carrier.

28. A network node, comprising:
one or more interfaces operable to broadcast system information that indicates a set of configured random access carriers, the set of configured random access carriers comprises at least one non-anchor carrier; and
one or more processors operable to:
select a random access carrier to be used by a wireless device when performing random access transmissions, the selected random access carrier associated with a non-anchor carrier selected from the set of configured random access carriers; and
indicate the selected random access carrier to the wireless on a non-anchor carrier, wherein to indicate the selected random access carrier, the one or more processors are operable to instruct the one or more interfaces to communicate downlink control information (DCI) that explicitly indicates the selected random access carrier to the wireless device, the DCI communicated via a control channel.

29. The network node of claim 28, wherein the control channel comprises a physical downlink control channel (PDCCH).

30. The network node of claim 29, wherein the PDCCH comprises a Narrowband PDCCH (NPDCCH).

31. The network node of claim 28, wherein the DCI is communicated in a control channel order.

32. The network node of claim 31, wherein the control channel order comprises a PDCCH order or an NPDCCH order, is sent to the wireless device in connected mode, and orders the wireless device to perform a random access transmission.

33. The network node of claim 28, wherein the DCI is communicated in a scheduling message that schedules a paging message and indicates the selected random access carrier to be used by the wireless device when performing the random access transmission that is initiated in response to the wireless device receiving the paging message.

34. The network node of claim 33, wherein the scheduling message is sent to the wireless device in idle mode, and wherein the scheduling message comprises an index indicating the selected random access carrier.

35. The network node of claim 28, wherein to indicate the selected random access carrier to the wireless device comprises, the one or more processors are operable to instruct the one or more interfaces to communicate a paging message via a Physical Downlink Shared Channel (PDSCH), wherein the paging message indicates the selected random access carrier to be used by the wireless device when performing the random access transmission that is initiated in response to the wireless device receiving the paging message.

36. The network node of claim 35, wherein the PDSCH comprises a Narrowband PDSCH (NPDSCH).

37. The network node of claim 28, wherein the system information broadcast by the network node provides information about downlink (DL) carriers and uplink (UL) carriers, the UL carriers belonging to the set of configured random access carriers.

38. The network node of claim 37, wherein the information about the carriers indicates an association between one of the DL carriers and a default uplink (UL) carrier.

39. The network node of claim 38, wherein to indicate the selected random access carrier to the wireless device comprises, the one or more processors are operable to instruct the one or more interfaces to communicate a message via one of the DL carriers, wherein communicating the message via that DL carrier implicitly indicates for the wireless device to perform the random access transmission using the default UL carrier associated with the DL carrier that communicated the message.

40. The network node of claim 28, wherein the random access carrier comprises a Narrowband Physical Random Access Channel (NPRACH) carrier.

41. A wireless device, the wireless device comprising:
one or more interfaces operable to receive system information being broadcast by a network node, wherein the system information indicates a set of configured random access carriers supported by the network node, the set of configured random access carriers comprises at least one non-anchor carrier; and
one or more processors operable to:
determine whether the network node has indicated a selected random access carrier on a non-anchor carrier from the set of configured random access carriers;
in response to determining that the network node has indicated the selected random access carrier, perform a random access transmission using the selected random access carrier indicated by the network node; and
in response to determining that the network node has not indicated the selected random access carrier, perform a random access transmission using a random access carrier that the wireless device selects from the set of configured random access carriers.

42. The wireless device of claim 41, wherein the one or more processors are operable to determine, based on receiving a downlink control information (DCI) from the network node that explicitly indicates the selected random access carrier to the wireless device, that the network node has indicated the selected random access carrier.

43. The wireless device of claim 42, wherein the DCI is carried on a physical downlink control channel (PDCCH).

44. The wireless device of claim 43, wherein the PDCCH comprises a Narrowband PDCCH (NPDCCH).

45. The wireless device of claim 42, wherein the DCI is communicated in a control channel order.

46. The wireless device of claim 45, wherein the control channel order comprises a PDCCH order or an NPDCCH order, is sent to the wireless device in connected mode, and orders the wireless device to perform a random access transmission.

47. The wireless device of claim 42, wherein the DCI is received via a scheduling message that schedules a paging message and indicates the selected random access carrier to be used by the wireless device when performing the random access transmission that is initiated in response to the wireless device receiving the paging message.

48. The wireless device of claim 47, wherein the scheduling message is received by the wireless device in idle mode, and wherein the scheduling message comprises an index indicating the selected random access carrier.

49. The wireless device of claim 41, wherein the one or more processors are operable to determine, based on receiving a paging message that indicates the selected random access carrier to be used by the wireless device when performing the random access transmission that is initiated in response to the wireless device receiving the paging message, that the network node has indicated the selected random access carrier.

50. The wireless device of claim 49, wherein the paging message is received via a Narrowband Physical Downlink Shared Channel PDSCH (NPDSCH) or other PDSCH.

51. The wireless device of claim 41, wherein the system information broadcast by the network node provides information about downlink (DL) carriers and uplink (UL) carriers, the UL carriers belonging to the set of configured random access carriers.

52. The wireless device of claim 51, wherein the information about the carriers indicates an association between one of the DL carriers and a default UL carrier.

53. The wireless device of claim 52, further operable to:
receive a message via one of the DL carriers;
determine a default UL carrier associated with the DL carrier that communicated the message; and
perform the random access transmission using the default UL carrier.

54. The wireless device of claim 41, wherein the selected random access carrier comprises a Narrowband Physical Random Access Channel (NPRACH) carrier.

* * * * *